United States Patent [19]
Sundburg et al.

[11] Patent Number: 5,747,793
[45] Date of Patent: May 5, 1998

[54] VARIABLE LIGHT SOURCE COMPENSATED OPTICAL FIBER SENSING SYSTEM

[75] Inventors: William J. Sundburg, Warren; Weiman Shi, Piscataway, both of N.J.

[73] Assignee: Advanced Fiber Optechs, Inc., Linden, N.J.

[21] Appl. No.: 539,035

[22] Filed: Oct. 4, 1995

[51] Int. Cl.⁶ ...................................................... H01J 5/16
[52] U.S. Cl. .................. 250/227.14; 250/205; 356/32
[58] Field of Search ......................... 250/227.14, 227.17, 250/227.18, 227.23, 205; 356/32–35, 43, 45; 385/12, 13, 119, 117, 115; 73/760, 763, 766, 744, 705

[56] References Cited

U.S. PATENT DOCUMENTS

| | | | |
|---|---|---|---|
| 4,356,396 | 10/1982 | Ruell et al. | 250/227.23 |
| 4,523,092 | 6/1985 | Nelson | 250/227.23 |
| 4,599,711 | 7/1986 | Cuomo | 250/227.21 |
| 4,703,175 | 10/1987 | Salour et al. | 250/227.23 |
| 4,918,492 | 4/1990 | Ferdinand et al. | 356/43 |
| 4,924,870 | 5/1990 | Wlodarczyk et al. | 73/705 |
| 4,947,038 | 8/1990 | Wiesmeier et al. | 250/227.23 |
| 5,004,913 | 4/1991 | Kleinerman | 250/227.21 |
| 5,065,010 | 11/1991 | Knute | 250/227.21 |
| 5,148,303 | 9/1992 | Biard | 250/227.21 |
| 5,149,963 | 9/1992 | Hassler, Jr. | 250/227.21 |
| 5,263,776 | 11/1993 | Abraham et al. | 356/45 |
| 5,275,053 | 1/1994 | Wlodarczyk et al. | 73/705 |
| 5,278,499 | 1/1994 | Ito et al. | 250/227.14 |
| 5,307,146 | 4/1994 | Porter et al. | 250/227.23 |
| 5,334,831 | 8/1994 | Maurice | 250/227.17 |

OTHER PUBLICATIONS

G. R. Petrie, K. W. Jones and R. Jones, "An Optical Fibre Sensor Array for the Measurement of Displacements of Complex Engineering Structures," SPIE vol. 586, *Fiber Optic Sensors*, pp. 244–249 (Jan. 1985).

*Primary Examiner*—Que Le
*Attorney, Agent, or Firm*—Edward Dreyfus, Esq.

[57] ABSTRACT

An analog, optical-fiber measuring system compensates for variations in the level of light attenuation occurring in the optical path of the measuring system. The analog, optical-fiber measuring system utilizes a "reference" light transmitted along a common optical-fiber path as the actual "sensing" light. The reference light has a wavelength which differs from the sensing light's wavelength. Effects of the variations in the level of light attenuation are eliminated by monitoring the variations in the attenuation experienced by the reference light along the common optical-fiber path and adjusting the respective intensities of the reference light and the sensing light as a function of the variations. Because the effects of the variations in the level of light attenuation are compensated by an analog scheme, accurate measurement of the selected physical parameter is insured without the need for a microprocessor. The analog, optical-fiber measuring system facilitates discrete optical fibers to be separated and reconnected without significantly affecting the integrity of the optical signal obtained via these discrete optical fibers.

30 Claims, 8 Drawing Sheets

VARIABLE LIGHT SOURCE COMPENSATED OPTICAL FIBER SENSING SYSTEM

FIELD OF THE INVENTION

This invention relates generally to an optical fiber system and its applications, and more particularly to an analog, optical-fiber measuring system that insures accurate measurements regardless of variations in the signal losses within the optical fibers and/or associated optical connectors.

BACKGROUND OF THE INVENTION

Most analog, optical-fiber measuring systems measure a selected physical parameter by monitoring the magnitude, or intensity, of light reflected or altered, i.e., "modulated," by a sensor mechanism. Typically, an LED located at one end of a transmitting optical fiber generates light which is transmitted through the transmitting optical fiber to a movable mirror which is part of the sensor mechanism located at the distal end, i.e., end furthermost from the light source, of the transmitting optical fiber. The movable mirror reflects the light generated by the LED back into the transmitting optical fiber or into a separate, receiving optical fiber placed parallel to the transmitting optical fiber.

In both configurations, an optical detector, which is located at the same end of the transmitting optical fiber as the LED, monitors the magnitude of the light reflected by the movable mirror. The magnitude of the reflected light monitored by the optical detector is a function of the position of the mirror relative to the distal end of the transmitting optical fiber (in the case of the single-fiber configuration) or the distal ends of the transmitting and receiving optical fibers (in the case of the dual-fiber configuration). The position of the mirror relative to the distal end(s) of the optical fiber(s) may be a function of any one of several outside stimuli such as pressure and temperature, or the position of the mirror may be a function of the position of a surface under investigation.

A critical problem encountered by the analog, optical-fiber measuring systems described above is variations in the level of attenuation experienced by the light over a given optical path. Even if only one continuous fiber is utilized to provide the optical path for the sensing light, the level of attenuation experienced by the light varies with changes in the amount of bending of the optical fiber(s). In addition, where multiple fiber segments are connected by optical-fiber couplers or connectors, the level of attenuation experienced by the light in a given optical-fiber coupler or connector may vary during usage. For example, optical losses occurring in the optical connectors will vary as a function of ambient temperature. As a result, the above-described variations in the level of attenuation cause errors in the "intelligence" signal, which is derived from the magnitude of the reflected light monitored by the detector, indicative of the physical parameter being measured by the analog, optical-fiber measuring system. For example, changes in the amount of bending of a given optical fiber during two separate measurements may result in two different readings of a given temperature.

One prior art optical-fiber measuring system shown in appended FIG. 4, which system is more fully disclosed in U.S. Pat. No. 4,703,175 issued to Michael M. Salour et al. on Oct. 27, 1987, addresses the above-mentioned problem by incorporating a reference-light system and a microprocessor circuit in addition to a sensing-light system having a sensing-light source, a sensing fiber and a sensing detector. As shown in FIG. 4, the prior system includes two LED assemblies 402 and 403 for generating a sensing light of wavelength λ1 and a reference light of λ2, respectively. The LED assemblies are alternately pulsed, and each light is transmitted through an optical fiber 410. An optical coupler 405 directs the light entering from the optical fiber 410 to two separates channels: the sensing fiber 415 and a reference channel 411. The light entering the reference channel 411 is detected by a reference detector 408 which converts the detected light level into a corresponding electrical signal to be processed by a microprocessor 401.

For the sensing light of wavelength λ1, a portion of the light entering the sensing fiber 415 is absorbed by a wavelength-selective material 414, and the remainder of the light entering the sensing fiber 415 is reflected by a mirror 413 and returned to the optical coupler 405. The optical coupler 405 directs the light reflected by the mirror 413 to the sensing detector 406 via a sensing channel 412, which detector similarly converts the detected light level into an electrical signal to be processed by the microprocessor 401. The reference light of wavelength λ2 experiences the same light propagation as the sensing light of wavelength λ1, but the reference light of wavelength λ2 is not absorbed by the wavelength-selective material 414. In total, four electrical signals corresponding to light levels detected by the detectors 406 and 408 are generated for each pair of light pulses having wavelengths λ1 and λ2. The microprocessor 401 uses a ratio derived from the four electrical signals to calculate the level of the physical parameter being measured, which calculated level is independent of the variations in the level of attenuation of light over a given optical path.

The above-mentioned prior art system suffers from two significant drawbacks. First, the prior art system utilizes a microprocessor to filter out the effects of variations in the level of attenuation of light over a given optical path. This inevitably increases the complexity of the optical-fiber measuring system. Second, the addition of a microprocessor invariably increases the cost of the optical-fiber measuring system.

Another prior art optical-fiber measuring system, which is disclosed in U.S. Pat. No. 4,924,870 issued to Marek T. Wlodarczyk et al. on May 15, 1990, utilizes a sensing light and a reference light having different frequencies. In this prior art system, the sensing light is alternately pulsed with the reference light along the same optical fiber. At the distal end of the optical fiber, the sensing light is modulated by a sensor and reflected back through the optical fiber, while the reference light is simply reflected back through the optical fiber without being modulated. The reflected lights are subsequently detected by a photodetector, and a comparator calculates the ratio of the respective intensities of the reflected lights to generate an output corresponding to the level of the physical parameter being measured, which calculated level is independent of the variations in the level of attenuation of light over a given optical path.

The prior art system disclosed in U.S. Pat. No. 4,924,870 suffers from drawbacks similar to those of the prior art system disclosed in U.S. Pat. No. 4,703,175. Because the prior art system disclosed in U.S. Pat. No. 4,924,870 utilizes a signal processing circuit to filter out the effects of variations in the level of attenuation of light over a given optical path, the complexity and the cost of the optical-fiber measuring system are invariably increased.

There is therefore a need for an improved, simpler optical-fiber measuring system that compensates for variations in the level of attenuation experienced by the sensing light over a given optical path.

OBJECTS AND SUMMARY OF THE INVENTION

The present invention provides an analog, optical-fiber measuring system which compensates for variations in the level of light attenuation occurring in the optical path of the measuring system. The present invention compensates for variations in the level of light attenuation by monitoring the variations and adjusting the light source as a function of the variations in light attenuation, thereby insuring accurate measurement of the selected physical parameter independent of the variations in light attenuation.

The analog, optical-fiber measuring system according to the present invention utilizes a scheme in which a "reference" light, which is transmitted along the same optical path as the "intelligence"(or a "sensing") light, indicates a change in the level of light attenuation along a given optical path. Two light sources, a reference-light source and a sensing-light source, in the form of LEDs (light emitting diodes) or lasers emit two light beams of different wavelengths. The reference-light source and the sensing-light source are alternately pulsed, and an optical filter located at the distal end of the optical fiber reflects the reference light back through the optical fiber and transmits the sensing light to a movable mirror. The movable mirror modulates, i.e., reflects, the sensing light as a function of the physical parameter being measured. Any change in the intensity of the reflected reference light indicates a change in the level of light attenuation along the optical path.

Once a change in the level of light attenuation is detected by the optical-fiber measuring system, the system automatically adjusts the respective intensities of the reference light and the sensing light generated by the two light sources to compensate for the change in the level of light attenuation. The respective intensities of the reference light and the sensing light are adjusted by driver circuits which control the operating current of the two light sources. As a result, the intensity of the sensing-light measured by the detector is substantially independent of the variations in the level of light attenuation along a given optical path.

The analog, optical-fiber measuring system according to the present invention may be implemented with one optical-fiber path or two parallel optical-fiber paths. In a single-path configuration, the reference light and the sensing light are pulsed and reflected along a single fiber path. In a dual-fiber configuration, the reference light and the sensing light are pulsed along a first fiber path and returned along a second fiber path to the detector.

By monitoring the integrity of the optical path(s) of the measuring system and adjusting the respective intensities of the sensing light and the reference light as a function of changes in the level of light attenuation, the present invention allows discrete optical fibers to be separated and reconnected without any significant effect on the integrity of the optical signal obtained via these discrete optical fibers. More specifically, if an optical fiber of the measuring system is accidentally cut, the separated fiber segments may be reconnected and the measurement system will automatically correct for any resulting change in the optical path; the measurement system according to the present invention does not require subsequent recalibrations. In addition, the measurement system according to the present invention allows interconnection of optical fibers with commercially available "non-precision" connectors. Furthermore, because the effects of variations in the level of light attenuation are compensated by an analog scheme, accurate measurement of a selected physical parameter is insured without the need for a microprocessor.

It is an object of the present invention to provide an economical optical-fiber system for measuring a selected physical parameter, which system compensates for variations in the level of attenuation experienced by the sensing light over a given optical path.

It is another object of the present invention to provide an economical method of accurately measuring a selected physical parameter using an optical-fiber measuring system, which measurements are substantially independent of the variations in the level of attenuation experienced by the sensing light over a given optical path.

It is another object of the present invention to provide an optical-fiber system for measuring a selected physical parameter, which system insures accuracy of measurements in the presence of variations in the level of attenuation experienced by the sensing light over a given optical path by utilizing an analog compensation circuit.

It is another object of the present invention to provide a method of accurately measuring a selected physical parameter in the presence of variations in the level of attenuation experienced by the sensing light over a given optical path by utilizing an analog compensation scheme.

It is another object of the present invention to provide an optical-fiber system for measuring a selected physical parameter, which system compensates for variations in the level of attenuation experienced by the sensing light over a given optical path without requiring a microprocessor or a signal processing circuit.

It is another object of the present invention to provide a method of accurately measuring a selected physical parameter, which method compensates for variations in the level of attenuation experienced by the sensing light over a given optical path without requiring signal processing.

It is another object of the present invention to provide an optical-fiber system for measuring a selected physical parameter, which system compensates for variations in the level of attenuation experienced by the sensing light over a given optical path by adjusting the reference-light source and the sensing-light source as a function of the observed variations.

It is another object of the present invention to provide a method of accurately measuring a selected physical parameter, which method compensates for variations in the level of attenuation experienced by the sensing light over a given optical path by adjusting the reference-light source and the sensing-light source as a function of the observed variations.

It is still another object of the present invention to provide an optical-fiber system for measuring a selected physical parameter, which system allows discrete optical fibers to be separated and reconnected without affecting the integrity of the optical signal obtained via the discrete optical fibers.

DETAILED DESCRIPTION OF THE INVENTION

Figure 1A:
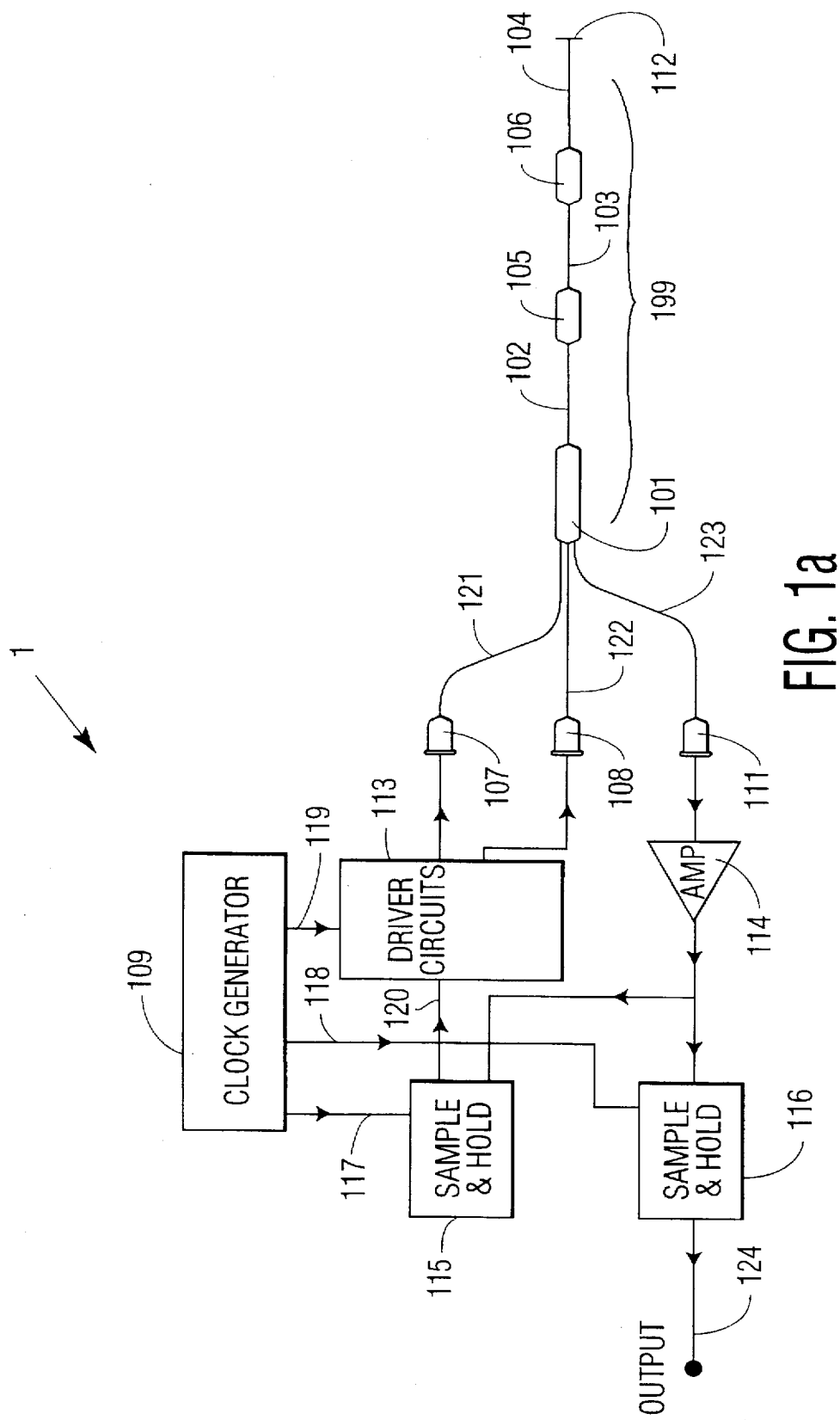
FIG. 1a is a block diagram of first preferred embodiment of the analog, optical-fiber sensing system according to the present invention.

As shown in FIG. 1a, the first preferred embodiment of an analog, optical-fiber measuring system 1 according to the present invention utilizes a single optical-fiber path 199 incorporating an optical coupler 101, optical-fiber segments 102, 103, and 104, and optical connectors 105 and 106. At one end of the optical-fiber path, a reference-light source 107 and a sensing-light source 108 in the form of LEDs or lasers, emit a reference light of wavelength $\lambda(R)$ and a sensing light of wavelength $\lambda(S)$, respectively. The reference-light source 107 and the sensing-light source 108 are alternately switched on by a clock signal 119 generated by a clock circuit 109. The reference light and the sensing light are introduced into the optical coupler 101 via a fiber segment 121 and a fiber segment 122, respectively.

Figure 1B:
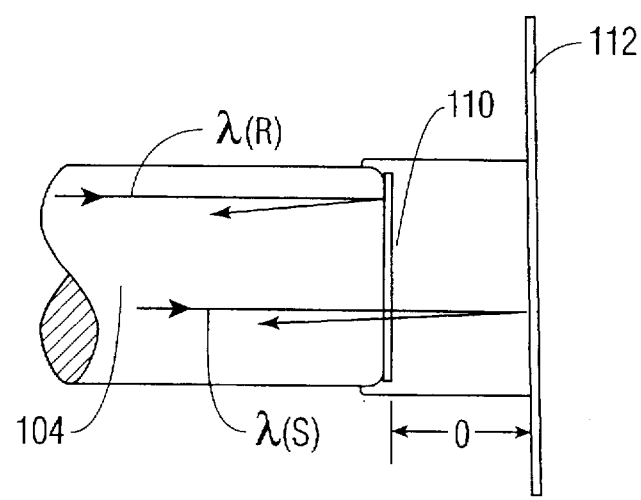
FIG. 1b is a view of the sensing portion of the analog, optical-fiber sensing system shown in FIG. 1a, which view shows the respective paths of a reference light and a sensing light.

As shown in FIG. 1b, an optical filter 110 located at the distal end of the fiber segment 104 reflects the reference light of wavelength $\lambda(R)$ and transmits the sensing light of wavelength $\lambda(S)$. The sensing light is subsequently reflected by a sensor, a movable mirror 112, which is adjustably coupled to the distal end of the fiber segment 104. The position of the movable mirror 112 relative to the distal end of the fiber segment 104, and hence the amount of the sensing light reflected back into the fiber segment 104 by the mirror 112, is determined as a function of the physical parameter being measured, which is temperature in the case of the preferred embodiment shown in FIGS. 1a and 1b.

A photodetector 111 coupled to the same end of the optical-fiber path 199 as the reference-light source 107 and the sensing-light source 108 alternately measures the respective magnitudes of the sensing light reflected from the movable mirror 112 and the reference light reflected from the optical filter 110. As shown in FIG. 1a, the photodetector 111 is connected to the optical coupler 101 via a fiber segment 123. With the exception of an "intelligence path" of distance 2D between the optical filter 110 and the movable mirror 112, as shown in FIG. 1b, both signals travel a common optical path. Accordingly, if the intensity of the reflected reference light detected by the photodetector 111 has changed, it indicates that the level of attenuation experienced by the sensing light along the common optical path has also changed.

An output signal of the photodetector 111 corresponding to the detected intensity of the reflected reference light is amplified by an amplifier 114 and fed to a first sample-and-hold circuit 115, which is synchronized (or "clocked") by a clock signal 117. An output 120 of the first sample-and-hold circuit 115 is fed to a controller which adjusts the intensities of the reference light and the sensing light. The controller is implemented as driver circuits, shown in FIG. 1a as a single block 113, which control the operating current of the light sources 107 and 108. The driver circuits 113 compare the output 120 with a predetermined signal level to determine whether the level of light attenuation along the common optical path has changed. Once a change in the level of light attenuation is detected, the driver circuits 113 adjust the intensity of the reference light and the sensing light generated by the light sources 107 and 108, respectively, to compensate for the change in the level of light attenuation along the common optical path. The driver circuits 113 are designed to compensate for the different quantum efficiencies of the reference-light source 107 and the sensing-light source 108.

When the photodetector 111 detects a reflected sensing signal, an output signal of the photodetector 111 corresponding to the detected intensity of the reflected sensing light is amplified by an amplifier 114 and fed to a second sample-and-hold circuit 116, which is synchronized (or "clocked") by a clock signal 118 generated by the clock generator 109. An output 124 of the second sample-and-hold circuit 116 is an analog voltage level representing the measured temperature, which analog voltage is substantially independent of the variations in the level of light attenuation along the optical path of the analog, optical-fiber measuring system 1.

Figure 2A:
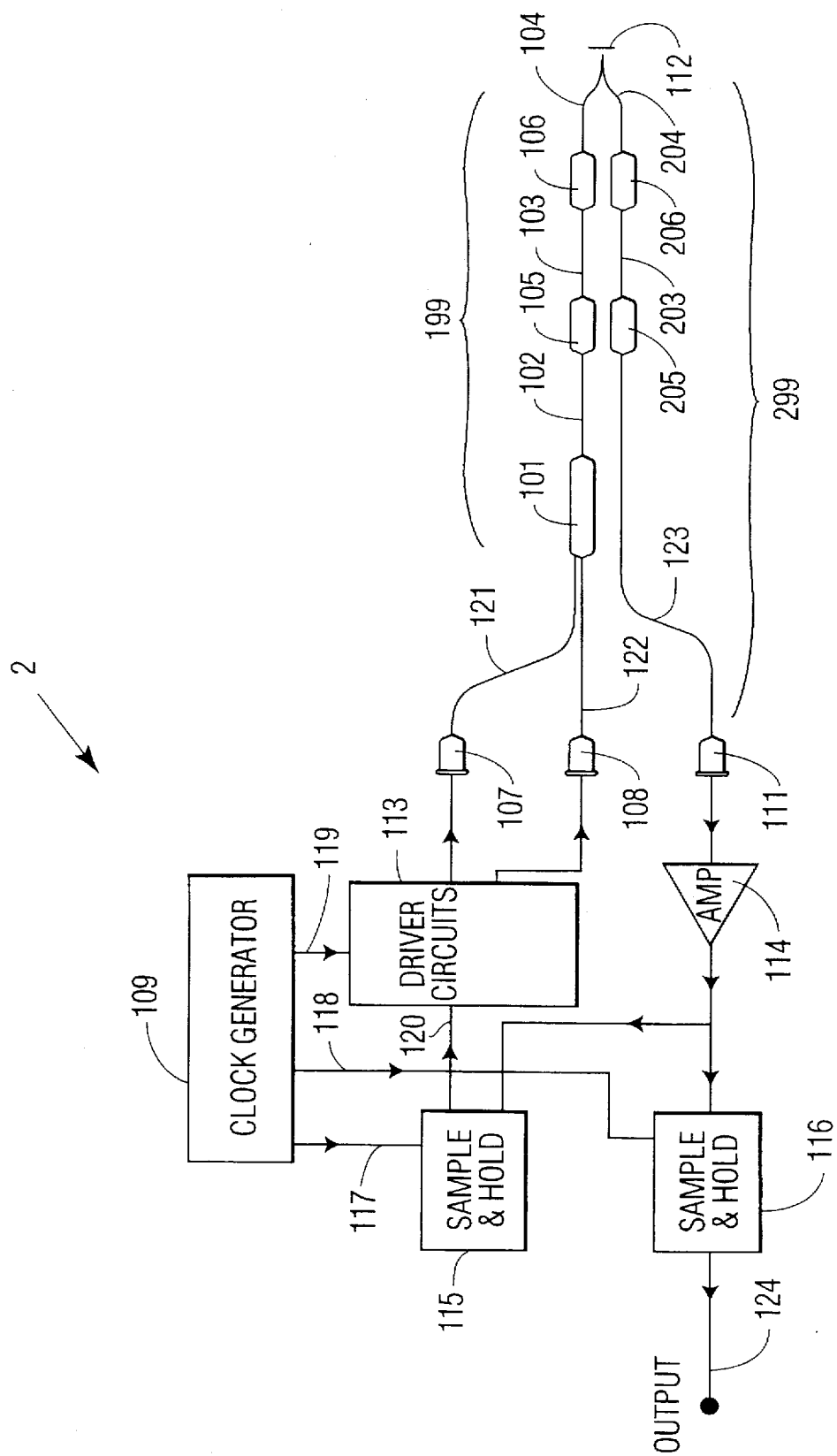
FIG. 2a is a block diagram of second preferred embodiment of the analog, optical-fiber sensing system according to the present invention.

As shown in FIG. 2a, the second preferred embodiment of an analog, optical-fiber measuring system 2 according to the present invention is substantially similar to the first preferred embodiment shown in FIG. 1a. However, the embodiment shown in FIG. 2a incorporates a second optical-fiber path 299 extending parallel to the optical-fiber path 199 incorporated in the first embodiment of FIG. 1a. The second optical-fiber path 299, which serves as the return path for the reflected reference light and the reflected sensing light, includes optical-fiber segments 204, 203, and 223, and optical connectors 205 and 206.

Figure 2B:
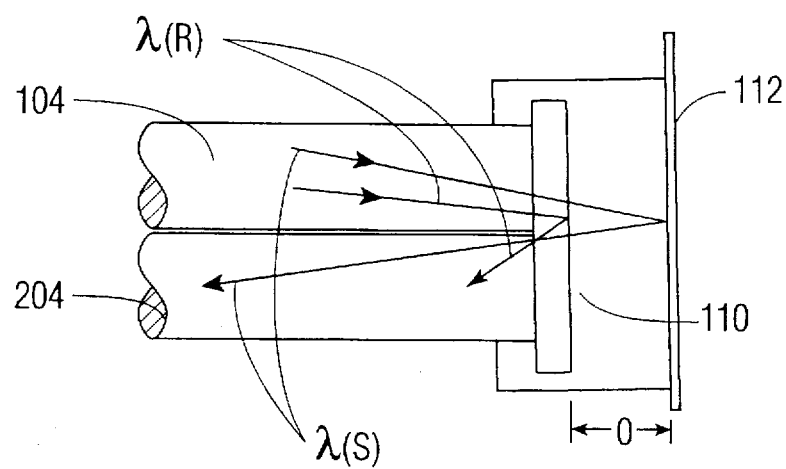
FIG. 2b is a view of the sensing portion of the analog, optical-fiber sensing system shown in FIG. 2a, which view shows the respective paths of a reference light and a sensing light.

The operation of the second preferred embodiment shown in FIG. 2a is substantially similar to that of the first embodiment shown in FIG. 1a. The reference-light source 107 and the sensing-light source 108 generate the reference light of wavelength $\lambda(R)$ and the sensing light of wavelength $\lambda(S)$, respectively. The reference light and the sensing light are introduced into the optical coupler 101 via a fiber segment 121 and a fiber segment 122, respectively. As shown in FIG. 2b, the optical filter 110 located at the distal end of the fiber segment 104 and 204 reflects the reference light of wavelength $\lambda(R)$ into the fiber segment 204 and transmits the sensing light of wavelength $\lambda(S)$. The sensing light is subsequently reflected by the movable mirror 112 which is adjustably coupled to the distal end of the fiber segments 104 and 204.

The photodetector 111 alternately measures the respective magnitudes of the sensing light reflected from the movable mirror 112 and the reference light reflected from the optical filter 110. When the photodetector 111 measures the magnitude of the reflected reference light, the driver circuits 113 compare the output 120 of the first sample-and-hold circuit 115, which in turn is based on the output on the output signal of the photodetector 111 corresponding to the detected intensity of the reflected reference light, to a predetermined signal level to determine whether the level of light attenuation along the common optical path has changed. Once a change in the level of light attenuation is detected, the driver circuits 113 adjust the intensities of the reference light and the sensing light to compensate for the variation in the level of light attenuation along the optical path.

In contrasting the preferred embodiments shown in FIGS. 1a and 2a, the single-fiber system has an obvious advantage of lower fiber cost. In addition, the single-fiber system has the added benefit of eliminating the considerations involved in positioning the optical filter 110: the optical filter 110 can be evaporated directly on the tip of the fiber segment 104. The disadvantage of the single-fiber configuration is the reflection of both the reference light and the sensing light at each connector interface, thereby distorting the detected intensity levels of the reference signal reflected by the optical filter 110 and the sensing signal reflected by the movable mirror 112. The spurious reflections can be minimized, but not completely eliminated, by using high quality connectors and an index matching fluid. An alternative solution to the spurious reflections is applying an "anti-reflection" coating on each connector. The dual-fiber configuration shown in FIGS. 2a and 2b eliminates the above-noted problem of spurious reflection caused by the connectors.

The above-described preferred embodiments of the measurement system according to the present invention may be used in conjunction with a remotely located electronic unit. The remotely located electronic unit converts the analog voltage data generated by the optical-fiber measurement system into numerical temperature value. It should be noted that the electronic unit which may be used in conjunction with the measurement system according to the present invention does not perform any process to compensate for any variations in the level of light attenuation occurring in the optical path of the measurement system; rather, the analog voltage data generated by the measurement system according to the present invention has been already compensated.

The first and second preferred embodiments of the present invention are particularly well adapted for temperature measurements in a high voltage environment, e.g., transformers, power lines, etc., because the optical fibers provide excellent voltage isolation between the measurement system and the remotely located signal processor. While the preferred embodiments of the measurement system according to the present invention are designed to continuously measure temperatures at least in the range of 0° C. to 125° C., and for short periods up to 150° C., the operating temperature range of the measurement system may be shifted to a lower or higher temperature region depending on the measurement needs.

Figure 5A:
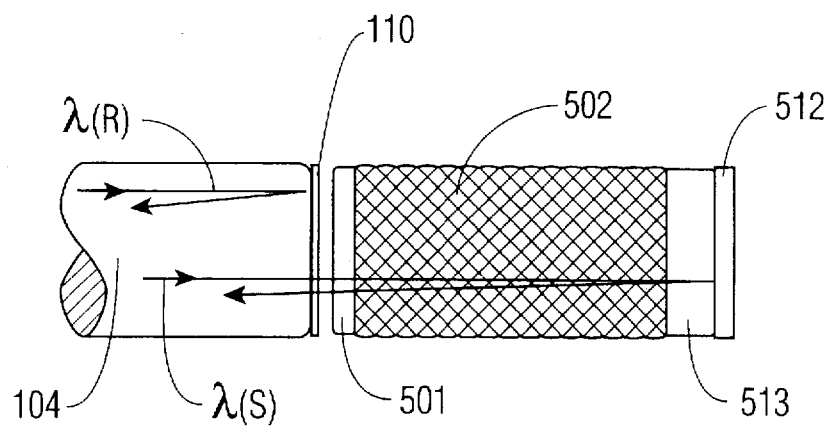
FIG. 5a is a view of the sensing portion of another single-fiber embodiment of the analog, optical-fiber sensing system according to the present invention, which sensing portion incorporates a mirror affixed to a Faraday Rotator.

Although the above-described preferred embodiments utilize the movable mirror 112 as the sensor to variably reflect, or modulated, a sensing light in order to measure a selected physical parameter, other light-modulating schemes utilizing a fixed mirror may be employed. One example of a fixed-mirror sensor unit, shown in FIG. 5a, incorporates a first polarizer 501, a second polarizer 513, a Faraday Rotator 502 and a fixed mirror 512. The incident sensing light $\lambda(S)$ passes through the polarizer 501, and the Faraday Rotator 502 rotates the polarized sensing light. The degree of rotation of the polarized sensing light occurring in the Faraday Rotator is a function of a chosen physical parameter to be measured, such as magnetic fields, electric fields, temperature or pressure. The second polarizer 513 is "crossed" relative to the first polarizer 501, i.e., the polarization angle of the second polarizer 513 is orthogonal relative to the polarization angle of the first polarizer 501, such that the amount of the polarized sensing light reaching the fixed mirror 512 is substantially zero when the Faraday Rotator 502 is neutral, i.e., when no rotation of the polarized light occurs.

Figure 5B:
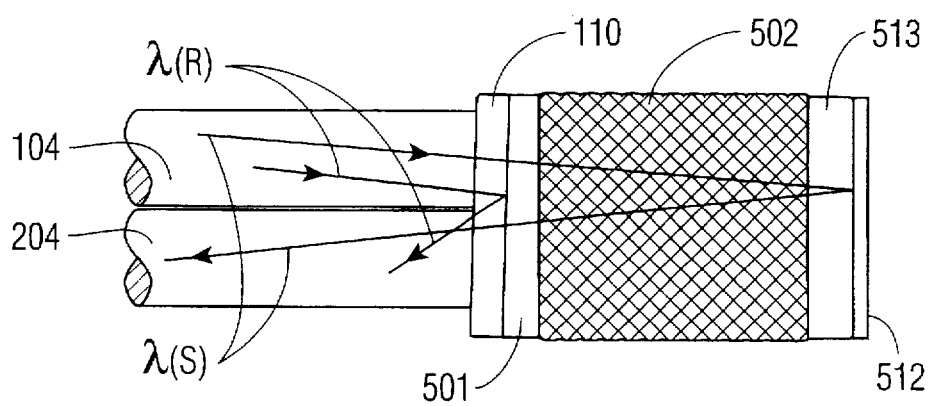
FIG. 5b is a view of the sensing portion of another dual-fiber embodiment of the analog, optical-fiber sensing system according to the present invention, which sensing portion incorporates a mirror affixed to a Faraday Rotator.

When the Faraday Rotator 502 is subject to the physical parameter to be measured, varying amounts of the polarized sensing light reaches the fixed mirror 512 as a function of the physical parameter: the greater the rotation of the polarized sensing light, the greater the amount of the polarized sensing light that reaches the mirror. The fixed mirror 512 reflects the polarized sensing light back through the Faraday Rotator 502 and the optical fiber 104 shown in FIG. 5a. Accordingly, the intensity of the reflected sensing light that reenters the optical fiber 104 indicates the level of the physical parameter being measured. A dual-fiber system utilizing the above-described fixed-mirror scheme is shown in FIG. 5b.

Figure 6A:
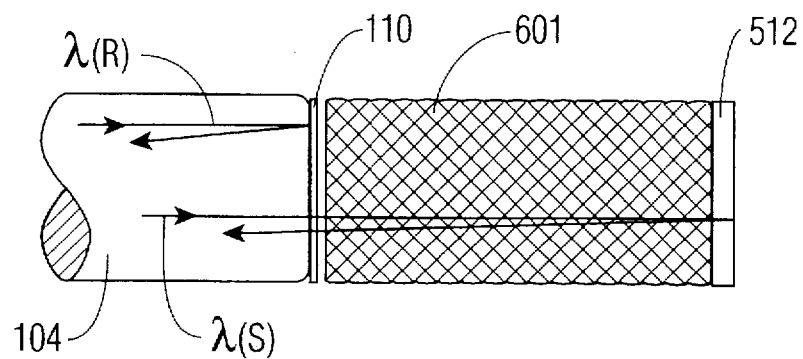
FIG. 6a is a view of the sensing portion of another single-fiber embodiment of the analog, optical-fiber sensing system according to the present invention, which sensing portion incorporates a mirror affixed to an optical crystal exhibiting variable optical characteristics.
Figure 6B:
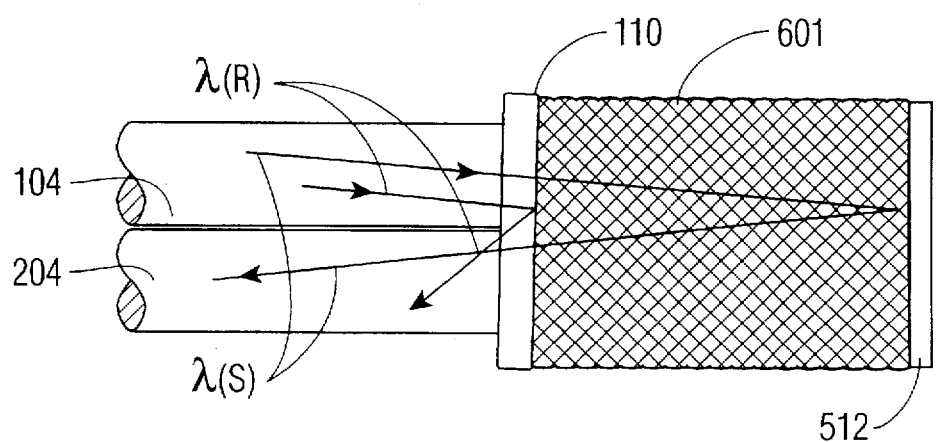
FIG. 6b is a view of the sensing portion of another dual-fiber embodiment of the analog, optical-fiber sensing system according to the present invention, which sensing portion incorporates a mirror affixed to an optical crystal exhibiting variable optical characteristics.

Another example of a fixed-mirror sensor unit, shown in FIG. 6a, incorporates an optical material 601, e.g., a crystal, which changes its light-transmission characteristics as a function of a chosen physical parameter to be measured, such as magnetic fields, electric fields, temperature or pressure. The incident sensing light $\lambda(S)$ travels through the optical material 601 and is reflected by the fixed mirror 512. The intensity of the reflected sensing light that reenters the optical fiber 104 indicates the level of the physical parameter being measured. A dual-fiber, fixed-mirror system utilizing an optical material with a variable light-transmission characteristics is shown in FIG. 6b.

Figure 3:
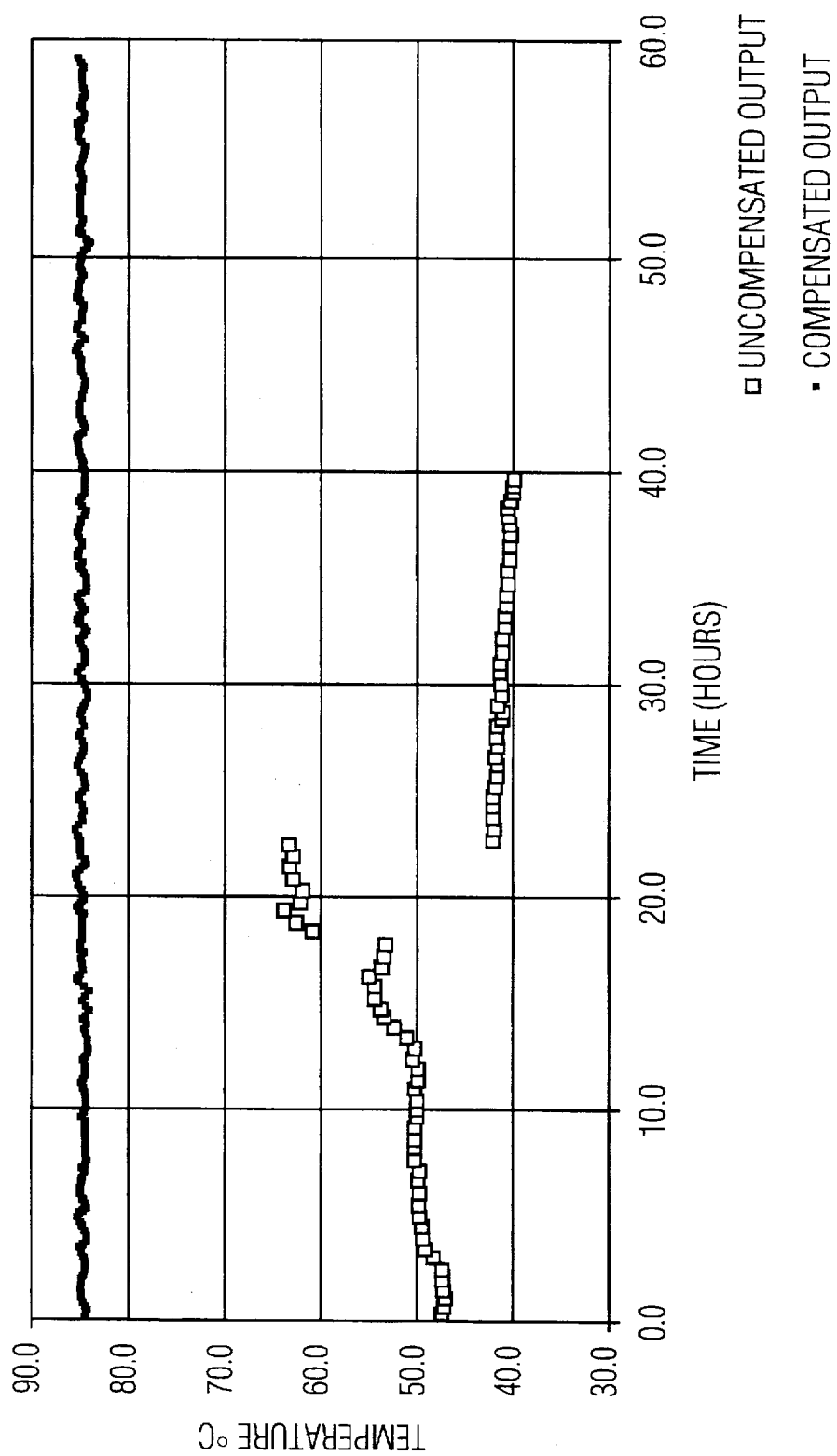
FIG. 3 is a temperature-versus-time chart showing the relative performances of the analog, optical-fiber sensing system according to the present invention and a prior-art, analog, optical-fiber sensing system which does not compensate for fiber bending or ambient temperature changes.
Figure 4:
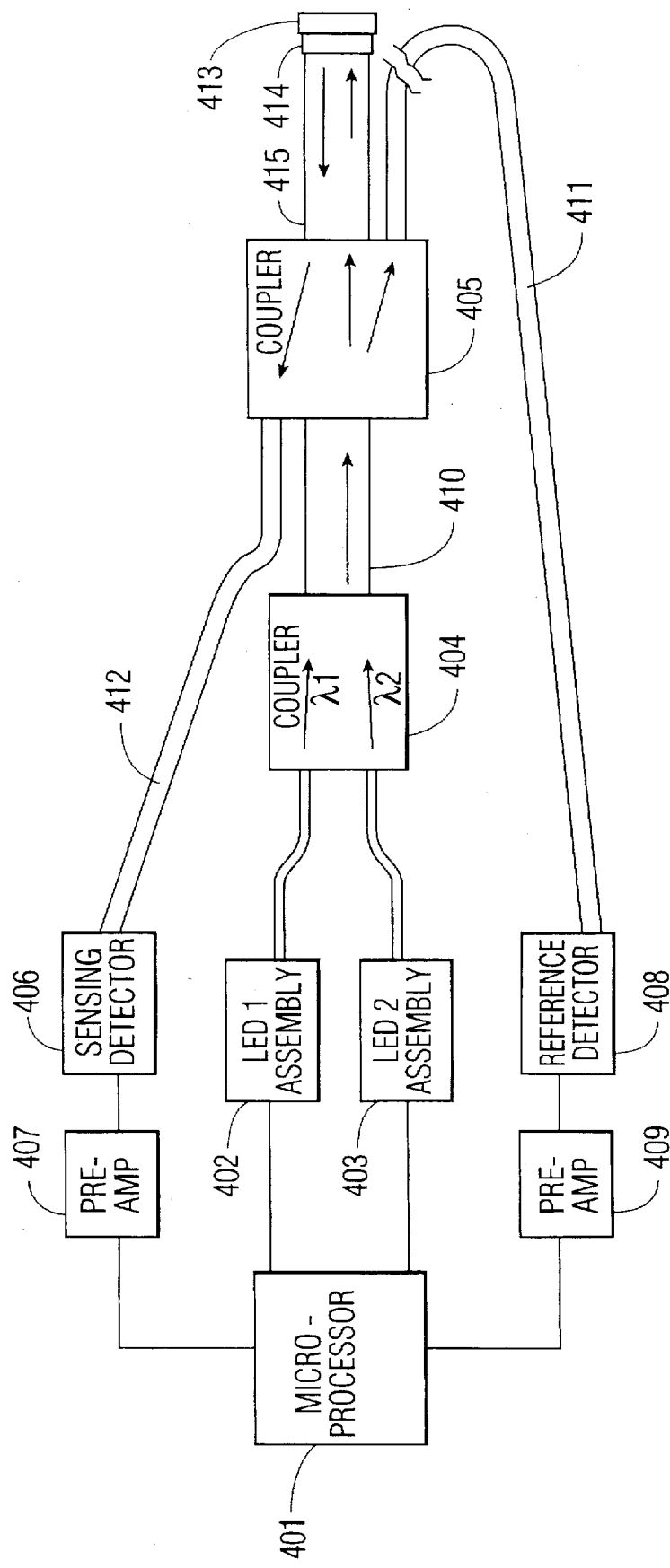
FIG. 4 is a block diagram of a prior-art, optical-fiber measurement system utilizing a microprocessor.

As shown in FIG. 3, the accuracy of measurements achieved with the first embodiment of the present invention is compared with the accuracy of measurements achieved with a conventional optical-fiber measuring system which does not incorporate a compensating element for variations in the level of light attenuation. The temperature being measured by the uncompensated measurement system was held at 50°±0.50° C. during the experiment. The temperature being measured by the first embodiment of the present invention was held constant at 80°±0.50° C.

As shown in FIG. 3, the open rectangles indicate the measurements achieved with an uncompensated temperature-measurement system, and the solid rectangles represent the measurements achieved with the first embodiment of the present invention. Although both measurement systems were subject to similar ambient temperature changes and fiber movements during the measurements, only the uncompensated measurements exhibit large variations and sudden changes, as can be seen from FIG. 3.

While specific, preferred embodiments have been described above, it should be understood that the above-described embodiments are exemplary in nature and are not to be construed as limiting the scope of protection for the invention as set forth in the appended claims. Numerous modifications to, or variations of, the above-described preferred embodiments should be readily apparent to those of ordinary skill in the art, and these modifications and variations are intended to be encompassed within the scope of protection as set forth in the appended claims. For example, although the preferred embodiments are adapted for temperature measurements, the present invention may be adapted for measurements of pressure, humidity, magnetic fields or electric fields. In addition, while the preferred embodiments have been described as utilizing two separate light sources to generate the reference and sensing lights, the present invention may be implemented with a single light-generating mechanism which alternately generates the reference and sensing lights having mutually exclusive wavelengths. Further, while the preferred embodiments incorporate a single sensing tip, the present invention may be modified by adding a second sensing tip and associated optical fibers for added reliability and accuracy.

I claim:

1. An analog, optical-fiber sensing system comprising:
   an optical-fiber network with at least one optical fiber, said network having a first end and a second end;
   a first light source optically coupled to said first end of said optical-fiber network for generating and introducing into said first end of said optical-fiber network a reference light having a first wavelength;
   a second light source optically coupled to said first end of said optical-fiber network for generating and introducing into said first end of said optical-fiber network a sensing light having a second wavelength;
   a filter located at said second end of said optical-fiber network, said filter reflecting said reference light back through said optical-fiber network and transmitting said sensing light;
   a sensor optically coupled to said second end of said optical-fiber network, said filter being positioned between said second end of said optical-fiber network and said sensor, said sensor variably modulating said sensing light back through said optical-fiber network, optical characteristics of said sensor varying as a function of a selected environmental parameter to be measured;
   a detector optically coupled to said first end of said optical-fiber network for detecting respective intensities of the reflected reference light and the modulated sensing light; and
   a controller for adjusting the intensities of said reference light and said sensing light generated by said first light source and said second light source, respectively, in response to a variation between the intensity of the reflected reference light and a predetermined intensity.

2. The sensing system of claim 1, wherein timing of said generation and introduction of said sensing light is mutually exclusive with timing of said generation and introduction of said reference light.

3. The sensing system according to claim 2, wherein said controller adjusts the intensities of said reference light and said sensing light by adjusting respective operating currents of said first light source and said second light source.

4. The sensing system according to claim 3, wherein said intensity of the reflected sensing light detected by the detector is indicative of said selected environmental parameter being measured.

5. The sensing system according to claim 4, wherein said sensor is a movable mirror.

6. The sensing system according to claim 5, wherein said filter is an optical filter that has been vapor-deposited.

7. The sensing system according to claim 6, wherein said mirror variably reflects said sensing light back through said optical-fiber network as a function of one of temperature and pressure.

8. The sensing system according to claim 6, wherein said mirror variably reflects said sensing light back through said optical-fiber network as a function of one of magnetic field and electric field.

9. The sensing system according to claim 1, wherein said optical-fiber network comprises a first optical fiber and a second optical fiber each having a first end and a second end, said second ends of said first and second optical fibers being substantially parallel and coterminous at said second end of said optical-fiber network, and wherein said first and second light sources are optically coupled to said first end of said first optical fiber, and wherein said filter reflects said reference light back through said second optical fiber, and wherein said sensor variably modulates said sensing light back through said second optical fiber, and wherein said detector is optically coupled to said first end of said second optical fiber.

10. The sensing system according to claim 9, wherein timing of said generation and introduction of said sensing light is mutually exclusive with timing of said generation and introduction of said reference light.

11. The sensing system according to claim 10, wherein said controller adjusts the intensities of said reference light and said sensing light by adjusting respective operating currents of said first light source and said second light source.

12. The sensing system according to claim 11, wherein said optical characteristics of said sensor vary as a function of one of temperature and pressure.

13. The sensing system according to claim 11, wherein said optical characteristics of said sensor vary as a function of one of magnetic field and electric field.

14. The sensing system according to claim 1, wherein said first light source and said second light source alternately generate said reference light and said sensing light, respectively, and wherein said sensor comprises a first optical polarizer having a first surface coupled to said optical filter, a Faraday Rotator having a first end coupled to a second surface of said first optical polarizer, a second optical polarizer having a first surface coupled to a second end of said Faraday Rotator, and a mirror coupled to a second end of said second optical polarizer.

15. The sensing system according to claim 1, wherein said first light source and said second light source alternately generate said reference light and said sensing light, respectively, and wherein said sensor comprises a crystal having a first end coupled to said filter and a mirror coupled to a second end of said crystal.

16. An analog, optical-fiber sensing system comprising:
   an optical fiber having a first end and a second end;
   a first light emitting diode optically coupled to said first end of said optical fiber for generating and introducing into said optical fiber a reference light having a first wavelength;
   a second light emitting diode optically coupled to said first end of said optical fiber for generating and introducing into said optical fiber a sensing light having a second wavelength, timing of said generation and introduction of said sensing light being mutually exclusive with timing of said generation and introduction of said reference light;
   an optical filter located at said second end of said optical fiber for reflecting said reference light back through said optical fiber and transmitting said sensing light;
   a mirror optically coupled to said second end of said optical fiber, said filter being positioned between said second end of said optical-fiber network and said mirror, said mirror variably reflecting said sensing light back through said optical fiber as a function of one of temperature and pressure;

a photodetector optically coupled to said first end of said optical fiber for detecting intensities of the reflected reference light and the reflected sensing light; and a controller for adjusting the intensities of said reference light and said sensing light generated by said first light emitting diode and said second light emitting diode, respectively, in response to a variation in the intensity between the reflected reference light and a predetermined intensity.

17. The sensing system according to claim 16, wherein said controller adjusts respective operating currents of said first light emitting diode and said second light emitting diode in response to said variation.

18. An analog, optical-fiber sensing system comprising:

a first optical fiber having a first end and a second end;

a second optical fiber having a first end and a second end, said second end of said second optical fiber being positioned substantially parallel to, and being coterminous with, said second end of said first optical fiber;

a first light emitting diode optically coupled to said first end of said first optical fiber for generating and introducing into said first optical fiber a reference light having a first wavelength;

a second light emitting diode optically coupled to said first end of said first optical fiber for generating and introducing into said first optical fiber a sensing light having a second wavelength, timing of said generation and introduction of said sensing light being mutually exclusive with timing of said generation and introduction of said reference light;

an optical filter located at said coterminous second ends of said first and second optical fibers for reflecting said reference light back through said second optical fiber and transmitting said sensing light;

a mirror optically coupled to said coterminous second ends of said first and second optical fibers, said optical filter being positioned between said mirror and said coterminous second ends of said first and second optical fibers, said mirror variably reflecting said sensing light back through said second optical fiber as a function of one of temperature and pressure;

a photodetector optically coupled to said first end of said second optical fiber for detecting intensities of the reflected reference light and the reflected sensing light; and a controller for adjusting the intensities of said reference light and said sensing light generated by said first light source and said second light source, respectively, in response to a variation between the intensity of the reflected reference light and a predetermined intensity.

19. The sensing system according to claim 18, wherein said controller adjusts respective operating currents of said first light source and said second light source in response to said variation.

20. A method of compensating for variations in the level of light attenuation occurring in a given optical path of an optical-fiber sensing system, said optical-fiber sensing system comprising an optical-fiber network with at least one optical fiber, a means optically coupled to a first end of said optical-fiber network for alternately generating a reference light of a first wavelength and a sensing light of a second wavelength, a sensor optically coupled to a second end of said optical-fiber network, optical properties of said sensor varying as a function of a selected physical parameter to be measured, an optical filter positioned between said second end of said optical-fiber network and said sensor, and a photodetector optically coupled to said first end of said optical-fiber network, said method comprising:

injecting said reference light into said first end of said optical-fiber network;

reflecting, at said second end of said optical-fiber network, said reference light back through said optical-fiber network by means of said optical filter;

measuring the intensity of the reflected reference light;

comparing the intensity of the reflected reference light with a predetermined intensity;

adjusting the respective intensities of said reference light and said sensing light generated by said light-generating means, in response to a difference between the intensity of the reflected reference light and the predetermined intensity;

injecting said sensing light into said first end of said optical-fiber network;

variably modulating, by means of said sensor optically coupled to said second end of said optical-fiber network, said sensing light back through said optical-fiber network as a function of said selected physical parameter to be measured; and measuring the intensity of the modulated sensing light.

21. The method according to claim 20, wherein said step of variably modulating said sensing light back through said optical-fiber network comprises:

polarizing said sensing light;

rotating the angle of polarization of said polarized sensing light as a function of one of temperature, pressure, magnetic field and electric field; and reflecting the polarized sensing light back through said optical-fiber network.

22. The method according to claim 20, wherein said step of variably modulating said sensing light back through said optical-fiber network comprises:

variably attenuating said sensing light as a function of one of temperature, pressure, magnetic field and electric field; and reflecting said sensing light back through said optical-fiber network.

23. An analog, optical-fiber sensing system comprising:

an optical-fiber network with at least one optical fiber, said network having a first end and a second end;

a light-generating unit optically coupled to said first end of said optical-fiber network for generating and introducing into said first end of said optical-fiber network at least a reference light having a first wavelength and a sensing light having a second wavelength, said light-generating unit alternately generating said reference light and said sensing light;

a filter located at said second end of said optical-fiber network, said filter reflecting said reference light back through said optical-fiber network and transmitting said sensing light;

a sensor optically coupled to said second end of said optical-fiber network, said filter being positioned between said second end of said optical-fiber network and said sensor, said sensor variably modulating said sensing light back through said optical-fiber network, optical characteristics of said sensor varying as a function of a selected environmental parameter to be measured;

a detector optically coupled to said first end of said optical-fiber network for detecting intensities of the reflected reference light and the modulated sensing light; and a controller for adjusting the intensities of said reference light and said sensing light generated by said light-generating unit, in response to a variation between the intensity of the reflected reference light and a predetermined intensity.

24. The sensing system according to claim 23, wherein said sensor is a movable mirror that variably reflects said sensing light as a function of said selected environmental parameter to be measured.

25. The sensing system according to claim 24, wherein said controller adjusts operating currents of said light-generating unit corresponding to said reference light and said sensing light.

26. The sensing system according to claim 23, wherein said optical-fiber network comprises a first optical fiber and a second optical fiber each having a first end and a second end, said second ends of said first and second optical fibers being substantially parallel and coterminous at said second end of said optical-fiber network, and wherein said light-generating unit is optically coupled to said first end of said first optical fiber, and wherein said filter reflects said reference light back through said second optical fiber, and wherein said sensor variably modulates said sensing light back through said second optical fiber, and wherein said detector is optically coupled to said first end of said second optical fiber.

27. The sensing system according to claim 26, wherein said sensor is a movable mirror that variably reflects said sensing light as a function of said selected environmental parameter to be measured.

28. The sensing system according to claim 27, wherein said controller adjusts operating currents of said light-generating unit corresponding to said reference light and said sensing light.

29. The sensing system according to claim 23, wherein said sensor comprises a first optical polarizer having a first surface coupled to said optical filter, a Faraday Rotator having a first end coupled to a second surface of said first optical polarizer, a second optical polarizer having a first surface coupled to a second end of said Faraday Rotator, and a mirror coupled to a second surface of said second optical polarizer.

30. The sensing system according to claim 23, wherein said sensor comprises a crystal having a first end coupled to said filter and a mirror coupled to a second end of said crystal.

* * * * *